Dec. 24, 1935.    M. G. KLEMME    2,025,210
COOKING STOVE
Filed Feb. 4, 1933    2 Sheets-Sheet 1

INVENTOR:
Maurice G. Klemme
HIS ATTORNEYS

Dec. 24, 1935.  M. G. KLEMME  2,025,210
COOKING STOVE
Filed Feb. 4, 1933  2 Sheets-Sheet 2
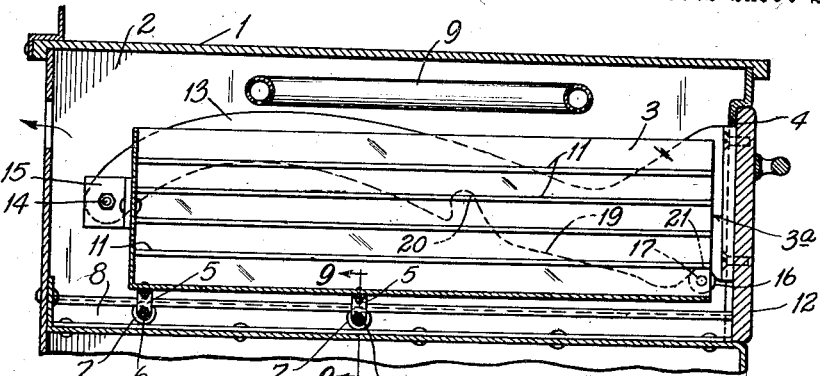
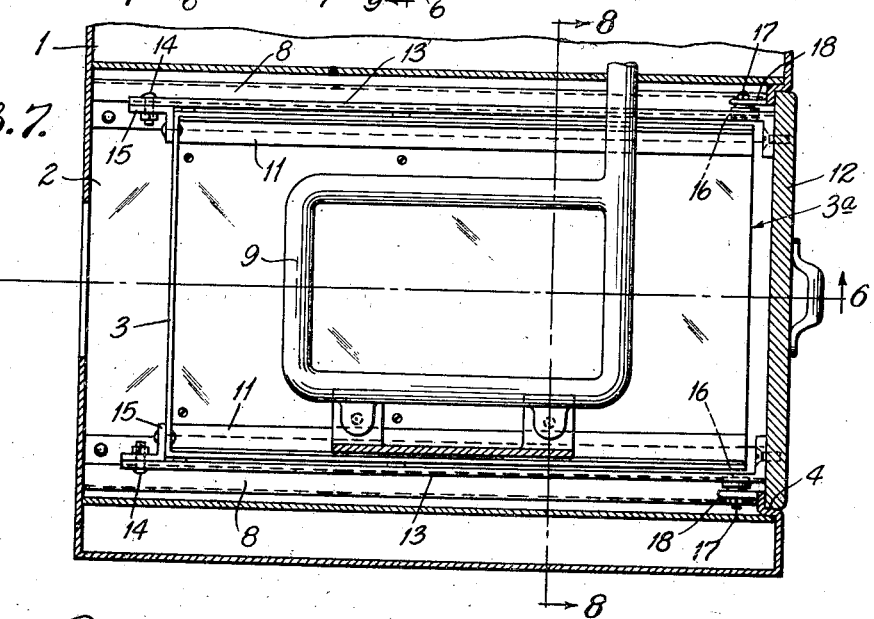
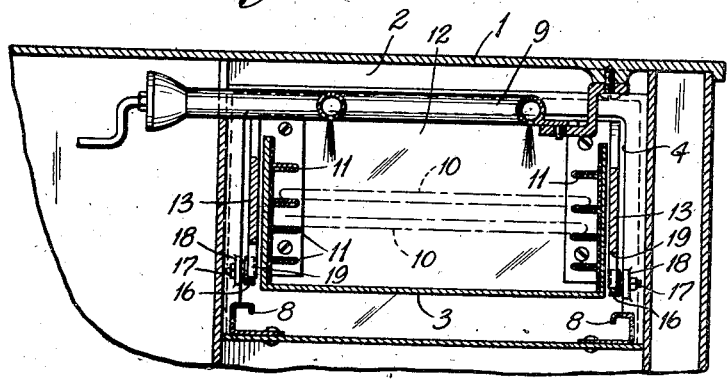
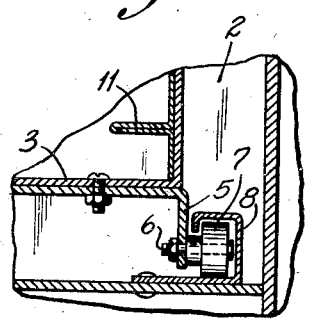

Patented Dec. 24, 1935

2,025,210

UNITED STATES PATENT OFFICE 2,025,210

COOKING STOVE

Maurice G. Klemme, Belleville, Ill., assignor to Eagle Foundry Company, Belleville, Ill., a corporation of Illinois Application February 4, 1933, Serial No. 655,145

3 Claims. (Cl. 126—340)

This invention relates principally to cooking stoves of the kind having a broiler drawer provided with a movable front door to facilitate insertion and removal of a broiler pan through the front of the drawer. It has for its principal objects to provide the broiler drawer with a front door which is automatically opened and closed during the opening and closing movements, respectively, of said drawer; to provide releasable means associated with the door operating mechanism for limiting the opening movement of the drawer and the downward swinging movement of the door thereof; and to provide for simplicity, cheapness and compactness in the construction and mounting of the drawer. The invention consists in the parts, combinations and arrangements of parts hereinafter described and claimed.

Figure 1:
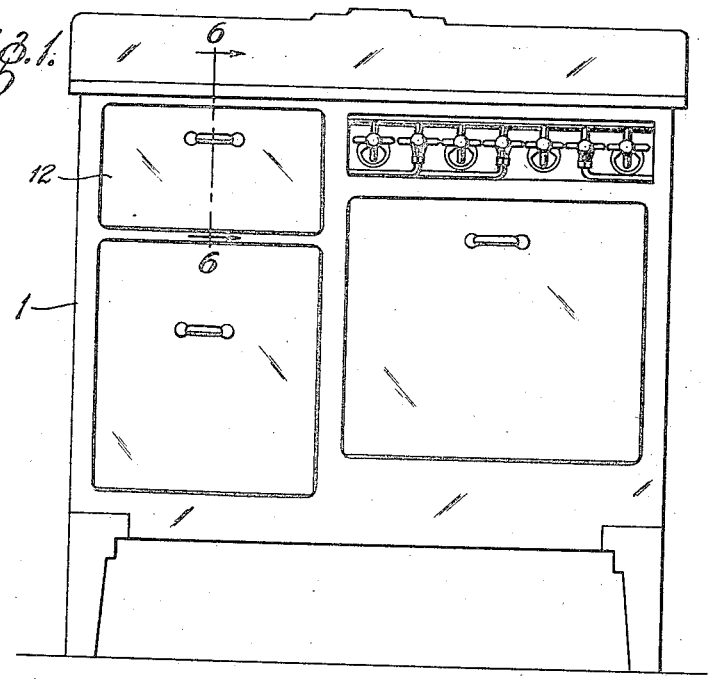
Figure 5:
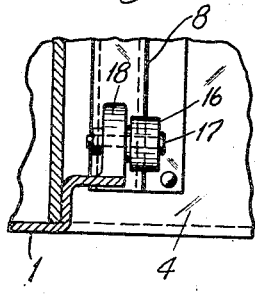
Figures 2, 3, 4:
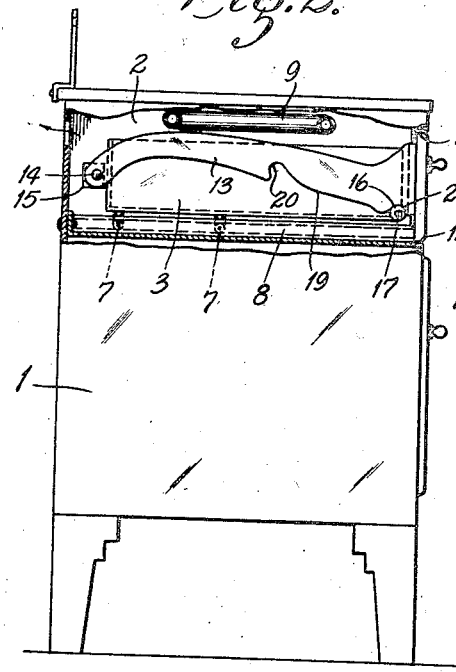

In the accompanying drawings, which form part of this specification and wherein like symbols refer to like parts wherever they occur, Fig. 1 is a front elevation of a cooking stove provided with a broiler drawer construction embodying my invention, Fig. 2 is an end elevation of said stove with the upper part shown broken away to disclose the closed broiler drawer, Fig. 3 is a view similar to Fig. 2, the broiler drawer being shown opened, Fig. 4 is a fragmentary front elevation of the broiler compartment portion of the stove with the broiler drawer shown removed, Fig. 5 is a detail section on the line 5—5 in Fig. 4, Fig. 6 is a vertical section on the line 6—6 in Fig. 1, Fig. 7 is a horizontal section on the line 7—7 in Fig. 6, Fig. 8 is a vertical section on the line 8—8 in Fig. 7; and Fig. 9 is a detail section on the line 9—9 in Fig. 6.

In the accompanying drawings, my invention is illustrated in connection with an ordinary form of gas range 1 provided with a broiler compartment 2 containing a broiler drawer 3, which is movable into and out of said compartment through an opening 4 in the front thereof. The sides of the broiler drawer 3 are provided with brackets 5, carrying pins 6 upon which are journaled rollers 7 that work in tracks 8 that are suitably secured to the bottom of the broiler compartment 2 adjacent to the sides thereof. The tracks 8 are preferably in the form of channels that embrace the rollers 7 and thus prevent the broiler drawer 3 from tilting in its open position.

Mounted in the upper portion of the broiler compartment 2 is a suitable gas burner 9 adapted to project its flame downwardly toward a broiler tray or pan 10 mounted in the broiler drawer 3. The side walls of the broiler drawer 3 are provided with vertically spaced longitudinal guides 11 adapted to support the broiler pan 10 at different levels in said broiler drawer. The broiler pan 10 is inserted in and removed from the broiler drawer 3 through an opening 3a in the front thereof, said opening also rendering the drawer readily accessible for cleaning.

The broiler drawer 3 is provided with a suitable closure member 12 adapted, in the closed position of said drawer, to automatically close both the pan receiving opening 3a in said drawer and the drawer receiving opening 4 in the open drawer compartment 2, and adapted, in the open position of said drawer, to move clear of said openings, the closure member 12 is supported at each end on the free outer end of an arm 13 that lies alongside of the boiler drawer 3 with its rear end pivotally supported on a horizontal pivot 14 mounted in a bracket 15 fixed to the rear end of said drawer. The free end portion of each closure supporting arm 13 rests on a roller 16 journaled on a pin 17 mounted in a lug 18 located within the broiler drawer compartment 2 adjacent to the lower corner of the drawer receiving opening 4 therein. Each closure supporting arm 13 has its roller engaging portion 19 of its lower edge shaped after the manner of a cam to produce a raising and lowering movement of said arm during the closing and opening movements, respectively, of the broiler drawer 3. The cam surface 19 terminates at its inner end in a notch 20 adapted to engage the arm supporting roller 16 and thus limit the opening movement of the broiler drawer. The location of the notch 20 is such that it engages the rollers 19 when the closure member 12 is substantially clear of the front opening 11 in the broiler drawer, thereby preventing further downward swinging movement of said closure member. By lifting the closure supporting arms 13, the notches 20 may be disengaged from the rollers 16 and the broiler drawer 3 entirely removed from the compartment 2. In the closed position of the broiler drawer each roller 16 seats on a shallow notch 21 at the outer end of the cam portion 19 of the arm 13 supported on said roller and thus tends to hold the drawer in closed position.

By the arrangement described, the broiler drawer may be quickly and easily opened by an outward pull on the closure member. During the opening movement of the broiler drawer, the outer notches 21 in the lower edges of the pivoted closure supporting arms 13 are first disengaged from the rollers 16, whereupon continued outward movement of the drawer causes the closure member 12 to swing downwardly clear of the opening 11 in the front end of the drawer by reason of the rolling contact of the upwardly curved cam surfaces 19 of said arms 13 with said rollers. When the closure member is clear of the front opening 11 in the broiler drawer, the notches 20 at the inner ends of the cam surfaces 19 of the arms 13 engage the rollers 16 and thus prevent further outward movement of said drawer. With the broiler drawer in this position, it may be entirely removed from the compartment by raising the closure member to disengage the notches 20 from the rollers 16. When the broiler drawer is pushed inwardly, the notches 21 are disengaged from the rollers 16 and the rolling contact of the cam surfaces 19 with said rollers causes the arms 13 to swing upwardly and move the closure member into closed position. In the fully closed position of the broiler drawer the closure member 12 is properly positioned with reference to the drawer receiving opening 4 of the broiler compartment 2, by the engagement of the notches 21 in the outer ends of the arms 13 with the arm supporting rollers 16.

What I claim is:

1. In combination with a cooking stove having a broiler compartment, a broiler drawer mounted in said compartment and having an opening in its front end, a closure member for the opening in said compartment, arms extending along opposite sides of said drawer with their front ends connected to said closure member and with their rear ends pivotally supported on said drawer, and rollers mounted in said compartment for supporting the free ends of said arms, the lower edges of said arms resting on said rollers and being shaped to produce a lowering movement of said arms when the drawer is being opened and a raising movement of said arms when the drawer is being closed, said arms having notches in their lower roller engaging edges for releasably holding said drawer in closed position.

2. In combination with a cooking stove having a broiler compartment, a broiler drawer mounted in said compartment and having an opening in its front end, a closure member for the opening in said compartment, arms extending along opposite sides of said drawer with their front ends connected to said closure member and with their rear ends pivotally supported on said drawer, and rollers mounted in said compartment for supporting the free ends of said arms, the roller engaging surface of said arms being shaped to produce a lowering movement of said arms when the drawer is being opened and a raising movement of said arms when the drawer is being closed, said arms having notches in their roller engaging surfaces for limiting the opening movement of said drawer and the lowering movement of said arms.

3. In combination with a cooking stove having a broiler compartment, a broiler drawer mounted in said compartment and having an opening in its front end, a closure member for the opening in said compartment, arms extending along opposite sides of said drawer with their front ends connected to said closure member and with their rear ends pivotally supported on said drawer, and supporting members on said stove for supporting the free ends of said pivoted arms, the lower edges of said arms resting on said supporting members and being shaped to produce a lowering movement of said arms when the drawer is being opened and a raising movement of said arms when the drawer is being closed, said lower edges of said arms having notches therein, whereby the opening movement of said drawer is limited by interengagement of said notches and said supporting members and whereby removal of said drawer is permitted by disengagement of said notches and supporting members.

MAURICE G. KLEMME.